US009281925B2

(12) United States Patent
Lee et al.

(10) Patent No.: US 9,281,925 B2
(45) Date of Patent: Mar. 8, 2016

(54) METHOD AND APPARATUS FOR PROVIDING COMMUNICATION SERVICE TO MOBILE STATION BY MULTIPLE BASE STATIONS IN COOPERATION IN WIRELESS COMMUNICATION SYSTEM (71) Applicant: Samsung Electronics Co., Ltd., Suwon-si, Gyeonggi-do (KR)

(72) Inventors: Ok-Seon Lee, Suwon-si (KR); Rakesh Taori, Suwon-si (KR); Ji-Yun Seol, Seongnam-si (KR); Young-Bin Chang, Anyang-si (KR); Cheol Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/625,300

(22) Filed: Feb. 18, 2015

(65) Prior Publication Data
US 2015/0163027 A1 Jun. 11, 2015

Related U.S. Application Data (63) Continuation of application No. 13/737,327, filed on Jan. 9, 2013, now Pat. No. 8,958,807.

(30) Foreign Application Priority Data

Jan. 9, 2012 (KR) .................. 10-2012-0002379
May 11, 2012 (KR) .................. 10-2012-0050477

(51) Int. Cl.
H04W 72/00 (2009.01)
H04L 5/00 (2006.01)
H04W 72/04 (2009.01)
H04W 24/10 (2009.01)

(52) U.S. Cl.
CPC ............. *H04L 5/0032* (2013.01); *H04W 72/04* (2013.01); *H04W 72/0426* (2013.01); *H04W 24/10* (2013.01)

(58) Field of Classification Search
CPC ............. H04W 36/00; H04W 36/005; H04W 36/0011; H04W 36/0055; H04W 36/0053
USPC .................. 455/450, 507, 502, 453; 370/350
See application file for complete search history.

(56) References Cited

U.S. PATENT DOCUMENTS

| 2009/0052428 | A1* | 2/2009 | Ryu et al. ............... 370/350 |
| 2011/0098072 | A1 | 4/2011 | Kim et al. |
| 2011/0255526 | A1 | 10/2011 | Kaneko et al. |
| 2011/0300872 | A1 | 12/2011 | Lim et al. |
| 2012/0252440 | A1* | 10/2012 | Watanabe ............... 455/423 |
| 2013/0165135 | A1 | 6/2013 | Ahluwalia |

FOREIGN PATENT DOCUMENTS

KR 10-2007-0069647 A 7/2007
WO 2011/072590 A1 6/2011

* cited by examiner

*Primary Examiner* — David Q Nguyen
(74) *Attorney, Agent, or Firm* — Jefferson IP Law, LLP (57) ABSTRACT A method and an apparatus for providing a service to a Mobile Station (MS) by a plurality of Base Stations (BSs) operating in cooperation in a wireless communication system are provided. The method includes configuring, by a master BS, a first cooperative cell including at least one slave BS, sending a resource request message for requesting resource allocation to the at least one slave BS included in the first cooperative cell, receiving, from each of the at least one slave BS, a resource request response message including resource approval control results for the resource allocation request, changing member BSs constituting the first cooperative cell based on the resource request response message, and allocating resources to an MS that is served in the first cooperative cell.

8 Claims, 8 Drawing Sheets

METHOD AND APPARATUS FOR PROVIDING COMMUNICATION SERVICE TO MOBILE STATION BY MULTIPLE BASE STATIONS IN COOPERATION IN WIRELESS COMMUNICATION SYSTEM

PRIORITY

This application is a continuation application of a prior application Ser. No. 13/737,327, filed on Jan. 9, 2013, which claimed the benefit under 35 U.S.C. §119(a) of a Korean patent application filed on Jan. 9, 2012 in the Korean Intellectual Property Office and assigned Serial No. 10-2012-0002379, and a Korean patent application filed on May 11, 2012 in the Korean Intellectual Property Office and assigned Serial No. 10-2012-0050477, the entire disclosure of each of which is hereby incorporated by reference.

BACKGROUND OF THE INVENTION

1. Field of the Invention

The present invention relates to a method and apparatus for providing a communication service to a Mobile Station (MS) by a plurality of Base Stations (BSs) in cooperation in a wireless communication system.

2. Description of the Related Art

A MS included in a wireless communication system may have a virtual cell that is formed flexibly or adaptively depending on the MSs moving path. The virtual cell may be considered to be a kind of cooperative cell that is formed for cooperative communication between BSs. The cooperative cell may include at least one BS, and if the cooperative cell includes two or more BSs, the BSs may transmit the same or different data to an MS at the same time or at different times.

For example, in a case where the cooperative cell includes two BSs, one BS may allocate resources of the cooperative cell, serving as a master BS, and the other BS may provide a service to an MS in cooperation with the master BS, serving as a slave BS. Since the cooperative cell is flexibly formed depending on the moving path of the MS, the roles of the BSs are also flexible in the cooperative cell. Specifically, a master BS in a first cooperative cell may be changed to another BS, and the master BS in the first cooperative cell formed to provide a service to a first MS may operate as a slave BS in a second cooperative cell formed to provide a service to a second MS.

In the case where one BS simultaneously belongs to several different cooperative cells in this way, there is a need for a resource allocation scheme for efficiently allocating resources of each BS. The resource allocation scheme may be classified as a centralized control scheme in which a master BS of each cooperative cell allocates resources of all BSs in the cooperative cell, and a distributed control scheme in which each BS of each cooperative cell allocates its resources individually.

However, in the centralized control scheme, in a case where a BS simultaneously belongs to multiple cooperative cells, if a resource allocation command received from a master BS of each cooperative cell instructs allocation of the same resources in a duplicate manner, resource allocation conflicts may occur. In this case, if a master BS of each cooperative cell coordinates the resource allocations through signaling with other BSs in order to prevent the resource allocation conflicts, significant overhead and time delay may occur.

In addition, the distributed control scheme may not be efficient in improving the system yield through the original inter-cell cooperation of the cooperative cells. Therefore, there is a need for a resource allocation scheme capable of more efficiently allocating resources of cooperative cells.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of exemplary embodiments of the present invention are address at least the above-mentioned problems and/or disadvantages and provide at least the advantages described below. Accordingly, an aspect of the present invention is to provide a method and apparatus for configuring and/or reconfiguring a cooperative cell to provide a communication service to one Mobile Station (MS) by multiple Base Stations (BSs) in cooperation in a wireless communication system.

Another aspect of the present invention is to provide a method and apparatus for determining a master BS and a slave BS to provide a communication service in a cooperative cell-based wireless communication system.

Furthermore, another aspect of the present invention is to provide a cooperative method and apparatus for efficient resource allocation between a master BS and a slave BS in a cooperative cell-based wireless communication system.

In accordance with an aspect of the present invention, a method for providing a service to a MS by a plurality of BSs operating in cooperation in a wireless communication system is provided. The method includes configuring, by a master BS, a first cooperative cell including at least one slave BS; sending a resource request message for requesting resource allocation to the at least one slave BS included in the first cooperative cell, receiving, from each of the at least one slave BS, a resource request response message including resource approval control results for the resource allocation request, changing member BSs constituting the first cooperative cell according to the resource request response message, and allocating resources to an MS that is served in the first cooperative cell.

In accordance with another aspect of the present invention, a Base Station (BS) apparatus for providing a service to a Mobile Station (MS) by a plurality of BSs operating in cooperation in a wireless communication system is provided. The BS apparatus includes a controller for configuring, by a master BS, a first cooperative cell including at least one slave BS, for changing member BSs included in the first cooperative cell according to a resource request response message which is received from each of the at least one slave BS belonging to the first cooperative cell and which includes resource approval control results for a resource allocation request, and for allocating resources to an MS that is served in the first cooperative cell, a transmitter for sending a resource request message for requesting resource allocation to the slave BSs belonging to the first cooperative cell, and a receiver for receiving the resource request response message from each of the at least one slave BS that have received the resource request message.

In accordance with further another aspect of the present invention, a method for providing a service to a Mobile Station (MS) by a plurality of Base Stations (BSs) operating in cooperation in a wireless communication system is provided. The method includes configuring, by a master BS, a first cooperative cell including at least one slave BS, sending, to at least one slave BS, upon determining to change the master BS of the first cooperative cell, a master BS request message for requesting to make a change to the master BS, receiving, from any one of the at least one slave BS, an ACKnowledgement (ACK) indicating a possibility of becoming a master BS, determining a slave BS, from any one of the at least one slave BS, that has sent the ACK to be a new master BS of the first cooperative cell, sending a master BS change message indicating the determined new master BS to the MS and all slave BSs of the first cooperative cell, and providing, by the determined new master BS, a service to the MS in cooperation with the at least one slave BS.

In accordance with yet another aspect of the present invention, a Base Station (BS) apparatus for providing a service to a Mobile Station (MS) by a plurality of BSs operating in cooperation in a wireless communication system is provided. The BS apparatus includes a controller for configuring by a master BS a first cooperative cell including at least one slave BS, for determining a slave BS that has sent an ACKnowledgement (ACK) indicating a possibility of becoming a master BS to be a new master BS of the first cooperative cell, and for controlling the determined new master BS to provide a service to the MS in cooperation with the at least one slave BS, a transmitter for, if the controller determines to change the master BS of the first cooperative cell, sending a master BS request message for requesting to make a change to a master BS to the at least one slave BS, and for sending a master BS change message indicating the determined new master BS to the MS and all of slave BSs of the first cooperative cell, and a receiver for receiving the ACK from one of the at least one slave BS.

In accordance with still another aspect of the present invention, a method for providing a service to a Mobile Station (MS) by a plurality of Base Stations (BSs) operating in cooperation in a wireless communication system is provided. The method includes configuring, by master BSs, a resource allocation-cooperative cell and sharing information used for resource allocation allocating resources considering MSs of all BSs belonging to the resource allocation-cooperative cell in order to optimize performance of the system, exchanging information about the resource allocation between BSs belonging to the resource allocation-cooperative cell, resolving a conflict between resource allocations which may occur during the resource allocation, and providing a service to the MS using the conflict-resolved new resource allocation information.

In accordance with still another aspect of the present invention, a Base Station (BS) apparatus for providing a service to a Mobile Station (MS) by a plurality of BSs operating in cooperation in a wireless communication system is provided. The BS apparatus includes a controller for configuring, by master BSs, a resource allocation-cooperative cell, for sharing information used for resource allocation, for allocating resources considering MSs of all BSs belonging to the resource allocation-cooperative cell to optimize performance of the system, and for resolving a conflict between resource allocations, which may occur during the resource allocation, and a transmitter for transmitting information about the resource allocation to BSs belonging to the resource allocation-cooperative cell, and for providing a service to the MS using the conflict-resolved new resource allocation information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

Exemplary embodiments of the present invention provide a method and apparatus for providing a communication service to one Mobile Station (MS) by a plurality of Base Stations (BSs) in a cell in which multiple BSs transmit the same or different data to one MS at the same time or at different times. In other words, exemplary embodiments of the present invention provide a cooperative cell formed for cooperative communication between BSs. The cooperative cell may also be referred to herein as a cloud cell.

Figure 1:
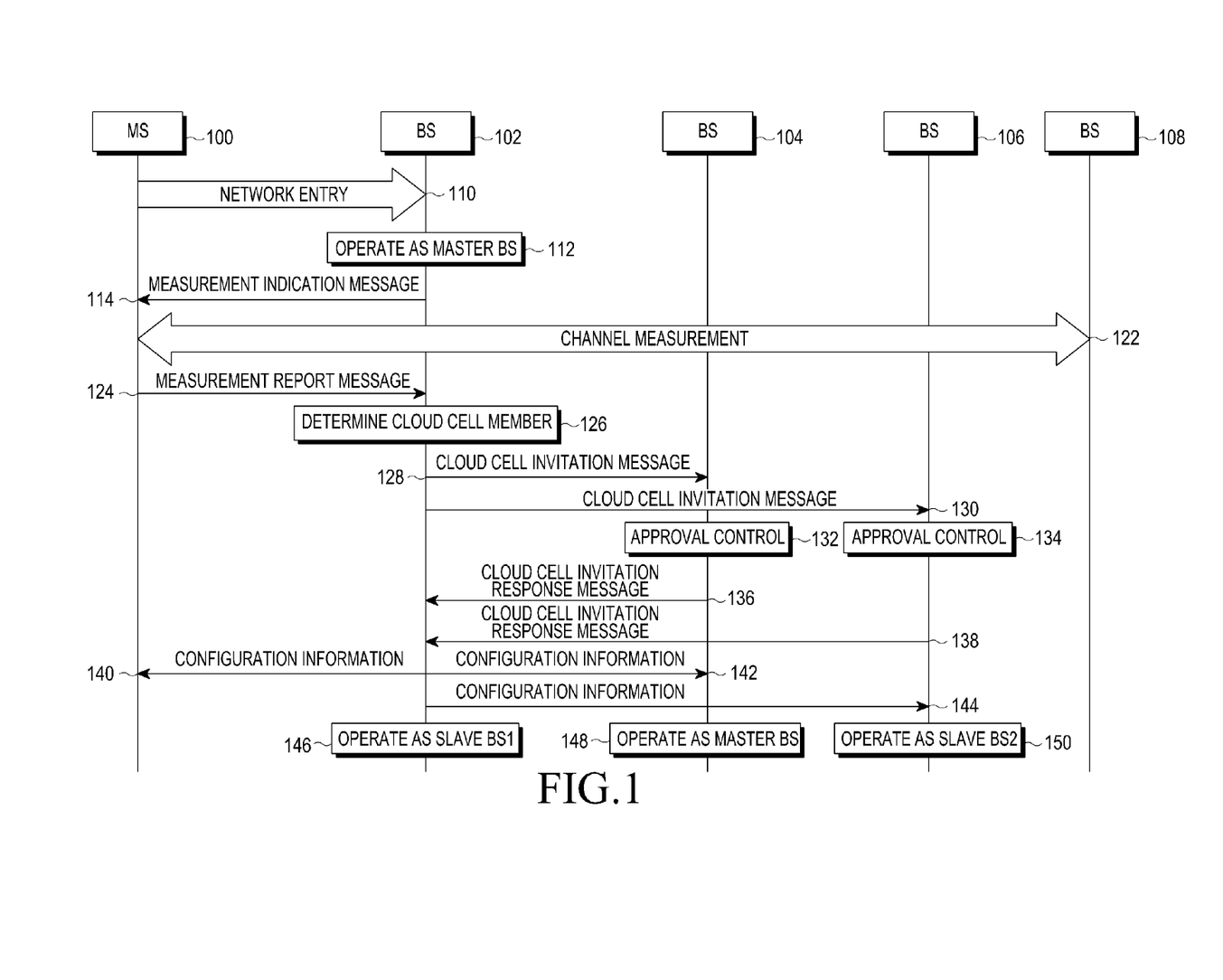
FIG. 1 illustrates a procedure for configuring a cloud cell in a communication system according to a first embodiment of the present invention.

FIG. 1 illustrates a procedure for configuring a cloud cell in a communication system according to a first embodiment of the present invention.

Referring to FIG. 1, the communication system includes an MS 100, a first BS 102, a second BS 104, a third BS 106 and a fourth BS 108.

The MS 100 performs a network entry operation to one of its neighbor BSs, for example, to the first BS 102 in step 110, and then the first BS 102 operates as a master BS in step 112. The first BS 102 operating as the master BS sends a measurement indication message to the MS 100 in step 114 to instruct the MS 100 to measure channels of its neighbor BSs, and the MS 100 measures channels of the first to fourth BSs 102 to 108 in step 122, and transmits the measurement results to the current master BS or the first BS 102 using a measurement report message in step 124. The measurement report message may be sent periodically, or may be sent intermittently by a command from a master BS.

Upon receiving the measurement report message, the first BS 102 determines members, such as member BSs, that will constitute a cloud cell among the neighbor BSs, based on channel states of the neighbor BSs, which are included in the measurement report message, in step 126. The first BS 102 determines or selects members that will constitute a cloud cell from among the BSs having an excellent channel state according to certain criteria. The first BS 102 determines the BS having the most excellent channel state from among the determined cloud cell members as a master BS, and determines the other BSs as slave BSs. The term 'master BS' as used herein may refer to a BS that allocates resources of the cloud cell, and the term 'slave BS' as used herein may refer to a BS providing a service to an MS in cooperation with the master BS.

In steps 128 and 130, the first BS 102 sends a cloud cell invitation message for inviting a BS to become or to serve as a member of the cloud cell to each of the BSs corresponding to the cloud cell members determined in step 126. The cloud cell invitation message includes information indicating that each of the second and third BSs 104 and 106 receiving the message is invited to become a master BS or a slave BS of the cloud cell.

Upon receiving the cloud cell invitation message, the second and third BSs 104 and 106 each determine whether to accept the invitation to become the cloud cell member through approval control in steps 132 and 134. Thereafter, the second and third BSs 104 and 106 transmit the determination results to the first BS 102 using a cloud cell invitation response message in steps 136 and 138. In the case of an ACKnowledgement (ACK) for accepting the invitation to become a cloud cell member, the BS sends an indicator indicating the invitation acceptance using a cloud cell invitation response message, and in the case of a Negative-ACKnowledgement (NACK) for not accepting or rejecting the invitation to become a cloud cell member, the BS sends an indicator indicating the invitation denial using a cloud cell invitation response message.

When sending the NACK, the BS may indicate a reason for rejecting the invitation, or in other words, a reason for the NACK. The reason for the NACK may include a cell load of the invited BS, an amount of available resources, the number of other cloud cells to which the BS already belongs, and any other similar and/or suitable reason. Specifically, the BS may reject the invitation to become a cloud cell member if at least one of: (i) the cell load of the invited BS is high, (ii) the amount of resources available for a new MS is small because of the high usage of resources preoccupied for MSs, and (iii) the number of other cloud cells to which the BS already belongs is greater than a predetermined number.

In steps 140, 142, and 144, the first BS 102 transmits configuration information including a list of a master BS and at least one slave BS of the cloud cell and information about an MS to which it will provide a service, to the MS 100 and the members, such as the second and third BSs 104 and 106, based on the cloud cell invitation response messages.

Upon receiving the configuration information from the first BS 102, the BSs operate as a master BS or a slave BS depending on the configuration information. For example, the first BS 102 operates as a first slave BS in step 146, the second BS 104 operates as a master BS in step 148, and the third BS 106 operates as a second slave BS in step 150. Therefore, the cloud cell consists of the second BS 104 serving as a master BS, and the first and third BSs 102 and 106 serving as slave BSs.

Figure 2:
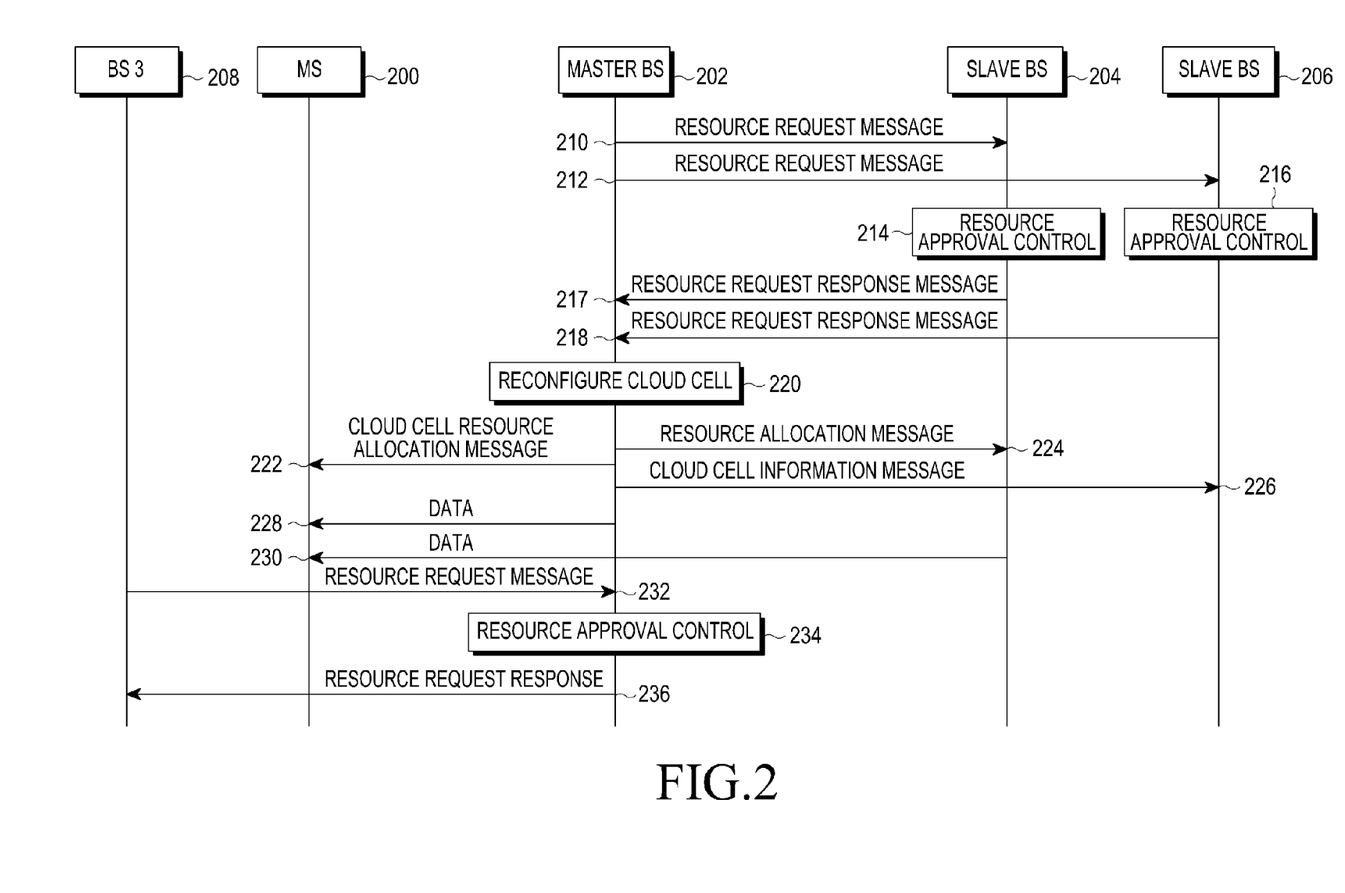
FIG. 2 illustrates a procedure for reconfiguring a cloud cell in a communication system according to a second embodiment of the present invention.

FIG. 2 illustrates a procedure for reconfiguring a cloud cell in a communication system according to a second embodiment of the present invention.

Although a cloud cell consisting of a master BS 202, a first slave BS 204 and second slave BS 206 will be considered in FIG. 2 by way of example, the present invention is not limited thereto, and the cloud cell may consist of one master BS and one or more slave BSs.

In steps 210 and 212, the master BS 202 sends a resource request message for requesting resource allocation to the first and second slave BSs 204 and 206 at every scheduling cycle. The master BS 202 may send a resource request message to the first and second slave BSs 204 and 206 at any time, even though the time of sending the resource request message is not at a predetermined scheduling cycle. The resource request message includes information on a required amount of resources, and a type of traffic in service such as real-time traffic, non-real-time traffic, etc. In a case where the type of traffic in service is real-time traffic, the resource request message may additionally include information on a maximum allowable delay time, which may also be referred to as 'maximum delay time'.

Upon receiving the resource request message, the first and second slave BSs 204 and 206 perform resource approval control in order to determine whether to approve the resource allocation request in steps 214 and 216, respectively. The first and second slave BSs 204 and 206 allocate resources in response first to the request for the traffic, a type of which is real-time traffic. If there is a plurality of requests for real-time traffic, the slave BS allocates resources in response first to the request, the maximum delay time of which is short. If the maximum delay time is the same, resources are allocated first to a slave BS operating as a master BS in another cloud cell among the first and second slave BSs 204 and 206.

Thereafter, in steps 217 and 218, the first and second slave BSs 204 and 206 each send a resource request response message including the resource approval results to the master BS 202 in response to the resource request message.

The resource request response message is sent as an ACK message if an amount of resources allocated is the same as that as requested by the master BS 202, and the resource request response message is sent as a NACK message if resources cannot be allocated for the amount requested by the master BS 202. The NACK message may include only the information indicating the rejection of the resource allocation, and may also include an amount of resources allocatable, starting from a resource block #0, that the master BS 202 can allocate for an MS 200, and a reason to reject resource allocation. Examples of the reason to reject resource allocation may be any of the following: (1) a traffic priority of another cloud cell, to which the first and second slave BSs 204 and 206 belong, is higher; (2) the maximum delay time of another cloud cell, to which the first and second slave BSs 204 and 206 belong, is shorter; and (3) the first and second slave BSs 204 and 206 each are a master BS in other cloud cells, to which the first and second slave BSs 204 and 206 belong. However, the present invention is not limited thereto, and the rejection reason may be any suitable reason.

It will be assumed in the present exemplary embodiment of FIG. 2 that the first slave BS 204 has approved the resource allocation request from the master BS 202, and the second slave BS 206 has rejected the resource allocation request from the master BS 202.

In step 220, the master BS 202 may reconfigure the cloud cell based on the resource approval results included in the resource request response message. Specifically, the master BS 202 determines at least one slave BS that will participate in the communication, and determines at least one slave BS that it will exclude from the cloud cell members. In FIG. 2, the first slave BS 204 that has approved the resource allocation request may be determined as a slave BS that will participate in the cooperative communication with the master BS 202, and the second slave BS 206 may be determined as a slave BS that will be excluded from the cloud cell members if the second slave BS 206 has sent a NACK message in response to the resource allocation request a predetermined number of times or more.

Thereafter, the master BS 202 sends a resource allocation message, which indicates its intention to use resources, to the first slave BS 204 determined to participate in the cooperative communication, in step 224, and sends a cloud cell information message including information indicating exclusion of the second slave BS 206 from the cloud cell to the second slave BS 206 determined to be excluded from the cloud cell members in step 226. In step 222, the master BS 202 sends a cloud cell resource allocation message indicating from which BSs the entire resources of the cloud cell are allocated, to the MS 200. Although it is assumed in FIG. 2 that the master BS 202 sends a resource allocation message indicating its intention to use resources to the first slave BS 204, it will be apparent to those of ordinary skill in the art that the master BS 202 may send the resource allocation message indicating its intention not to use resources depending on its decision. As the master BS 202 uses resources of the first slave BS 204 in this way, the master BS 202 and the first slave BS 204 may transmit data to the MS 200 in cooperation in steps 228 and 230, respectively.

The master BS 202 may serve as a slave BS in another cloud cell, and below-described steps 232 to 236 will be assumed to be a case where the master BS 202 operates as a slave BS in another cloud cell. The master BS 202 receives a resource request message for requesting resource allocation from a master BS of another cloud cell, i.e., a third BS 208, in step 232, performs resource approval control in step 234, and sends a resource request response message including the resource approval control results to the third BS 208 in step 236.

As discussed above, the procedure for configuring a cloud cell, and transmitting data by a slave BS, which is a member of the cloud cell, in cooperation with the master BS through resource approval control, has been described by way of example with reference to FIGS. 1 and 2. A procedure for changing a master BS while the master BS and a slave BS are transmitting data in cooperation will be described below.

Figure 3:
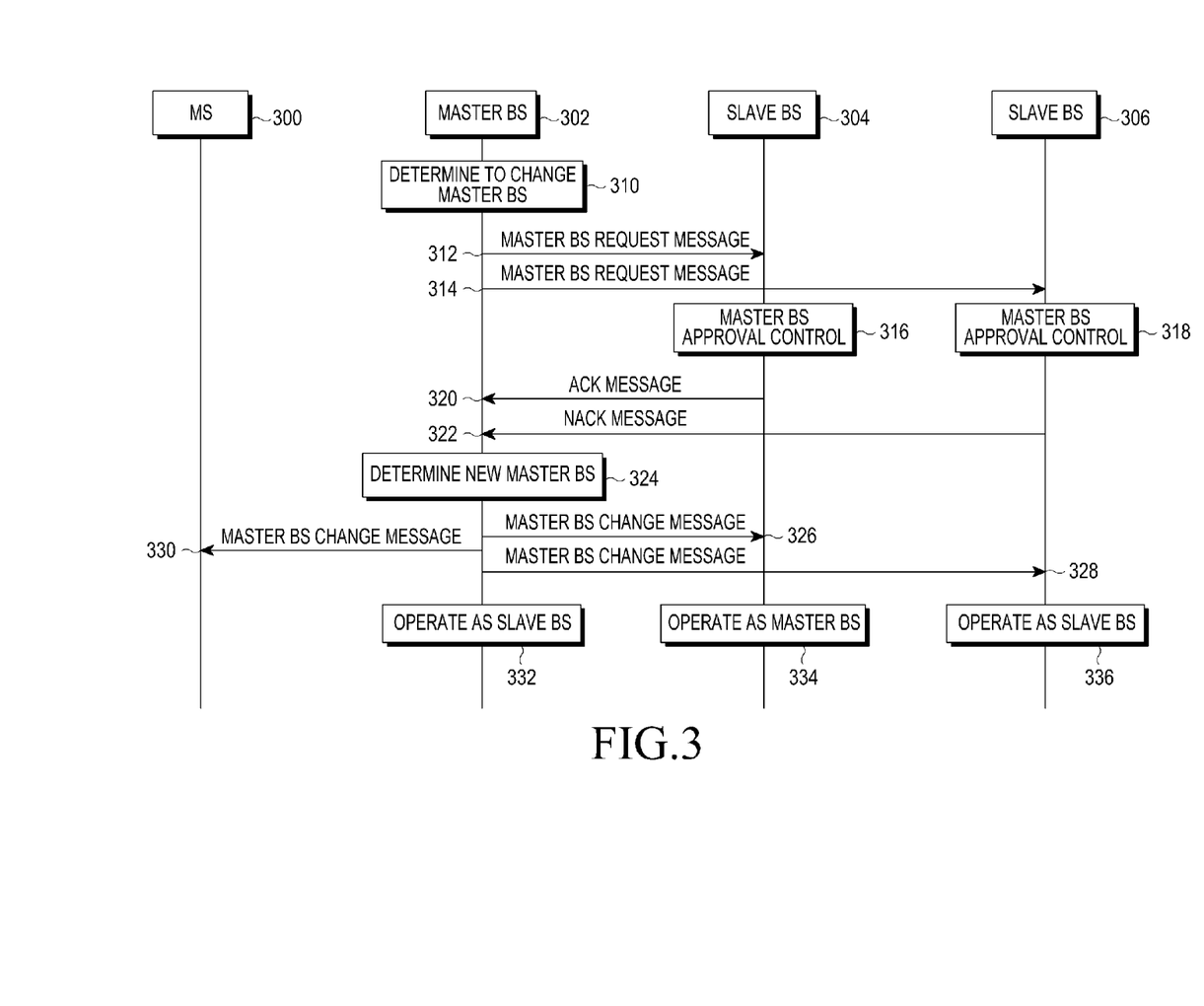
FIG. 3 illustrates a procedure for changing a master Base Station (BS) in a cloud cell-based communication system according to a third embodiment of the present invention.

FIG. 3 illustrates a procedure for changing a master BS in a cloud cell-based communication system according to a third embodiment of the present invention.

Referring to FIG. 3, the communication system includes an MS 300, a master BS 302, a first slave BS 304 and a second slave BS 306. The master BS 302, the first slave BS 304 and the second slave BS 306 constitute a first cloud cell, and the first and second slave BSs 302 and 304 are assumed to be members of a second cloud cell.

In step 310, the master BS 302 of the first cloud cell determines to change a master BS of the first cloud cell if it cannot provide the minimum service quality or minimum Quality of Service (QoS) to the MS 300 or if its channel state is less than a threshold for a predetermined time. The channel state information may be acquired from a measurement report message received, for example, from the MS 300 or from any other suitable source.

Upon determining to change the master BS, the master BS 302 the sends a master BS request message for requesting to become a master BS to each of the first and second slave BSs 304 and 306, which are members of the first cloud cells, in steps 312 and 314. The master BS request message includes a type of traffic, such as real-time traffic or non-real-time traffic, that the master BS 302 serves, and the required minimum amount of resources. If the traffic that the master BS 302 serves is real-time traffic, then the master BS request message may also include the maximum delay time. The first and second slave BSs 304 and 306, to which the master BS 302 sends the master BS request message, may be BSs whose channel quality is greater than or equal to a threshold.

Upon receiving the master BS request message, the first and second slave BSs 304 and 306 determine whether they can provide the minimum service quality to the MS 300, or determine priorities of the master BS of the second cloud cell, which is another cloud cell to which they belong, and the master BS 302 of the first cloud cell, through master BS approval control in steps 316 and 318, respectively, and send an ACK message or a NACK message to the master BS 302 in response to the master BS request message depending on the consideration results, in steps 320 and 322, respectively. Based on the master BS request message, the slave BSs 304 and 306 each allocate resources depending on the resource allocation priority, determine whether they can support the required minimum amount of resources requested in the master BS request message, and send an ACK message if they can support the required minimum amount of resources.

The slave BS allocates resources in response to the request for the traffic, a type of which is real-time traffic. If there is a plurality of requests for real-time traffic, the slave BS allocates resources in response to the request, the maximum delay time of which is short. If the maximum delay time is the same, resources are allocated to a slave BS operating as a master BS in another cloud cell from among the first and second slave BSs 304 and 306.

If the slave BS sends a NACK message because it cannot support the required amount of resources requested in the master BS request message, then the slave BS may include the following rejection reasons in the NACK message. Examples of the rejection reason may be at least one of the following: (1) a traffic priority of another cloud cell, to which the first and second slave BSs 304 and 306 belong, is higher; (2) the maximum delay time of another cloud cell, to which the first and second slave BSs 304 and 306 belong, is shorter; and (3) the first and second slave BSs 304 and 306 each are a master BS in other cloud cells, to which the first and second slave BSs 304 and 306 belong. However, the present invention is not limited thereto, and the rejection reason may be any suitable reason.

It will be assumed in the exemplary embodiment of FIG. 3 that the first slave BS 304 sends an ACK message in step 320 and the second slave BS 306 sends a NACK message in step 322. The master BS 302 determines the first slave BS 304 that sent an ACK message, as a new master BS in step 324, and sends a master BS change message including information indicating the change of the master BS to a new master BS, to each of the first and second slave BSs 304 and 306 and the MS 300 in steps 326, 328 and 330. Although not shown, the master BS 302 may determine the new master BS and also at least one new slave BS in step 324.

Thereafter, the first slave BS 304 that the master BS 302 determined as a new master BS operates as a master BS in the first cloud cell in step 334 upon receiving the master BS change message in step 326, the master BS 302 operates as a first slave BS in step 322, and the second slave BS 306 operates as a second slave BS in step 336 upon receiving the master BS change message in step 328.

Although it is assumed in the exemplary embodiment of FIG. 3 that an ACK is received from only the first slave BS 304 by way of example, the ACK may be received from two or more slave BSs, and if an ACK is received from each of two or more slave BSs, the master BS 302 may consider the other channel state and cell load, and determine one slave BS having a lower cell load as a new master BS if their channel states are better or the same.

If a NACK is received from both of the first and second slave BSs 304 and 306, then the master BS 302 compares rejection reasons received together with the NACK, selects one slave BS, a priority of whose rejection reason is lower, and determines the selected slave BS as a new master BS of the first cloud cell. An operation of determining a new master BS upon receiving a NACK from both of the first and second slave BSs 304 and 306 will be described below in more detail.

Figure 4:
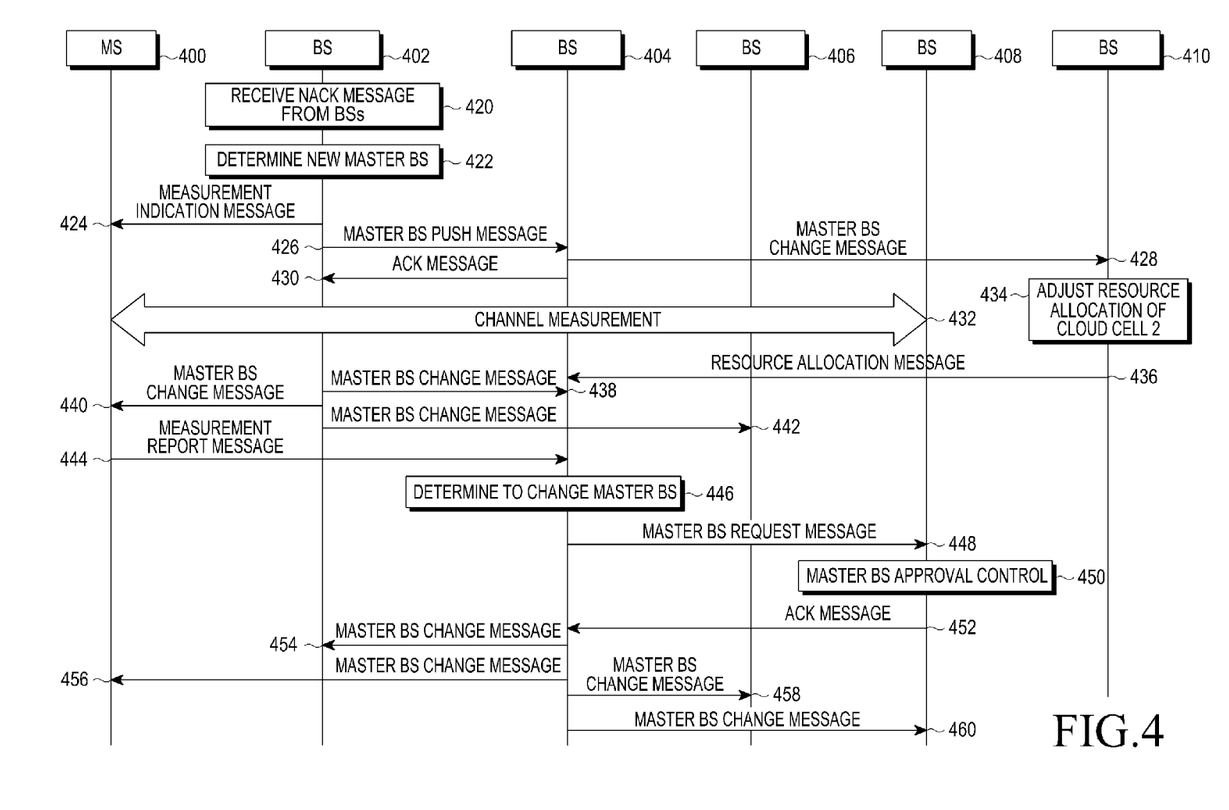
FIG. 4 illustrates a procedure for changing a master BS in a cloud cell-based communication system according to a fourth embodiment of the present invention.

FIG. 4 illustrates a procedure for changing a master BS in a cloud cell-based communication system according to a fourth embodiment of the present invention.

Referring to FIG. 4, the communication system includes a first MS 400, a first BS 402, a second BS 404, a third BS 406, a fourth BS 408, and a fifth BS 410. In addition, the communication system is assumed to include a first cloud cell and a second cloud cell. The first cloud cell includes the MS 400, the first BS 402 operating as a master BS, and the second and third BSs 404 and 406 operating as slave BSs. The second cloud cell includes a second MS (not shown), the second BS 404 operating as a slave BS, and the fifth BS 410 operating as a master BS. Specifically, in the present exemplary embodiment of FIG. 4, the second BS 404 is assumed to be a BS that is included in both the first and second cloud cells.

If the first BS 402 operating as a master BS receives a NACK message indicating the rejection of becoming a master BS from the second and third BSs 404 and 406 operating as slave BSs in step 420, then the first BS 402 selects one slave BS by comparing rejection reasons received together with the NACK message, and determines the selected slave BS as a new master BS in step 422.

Upon receiving a NACK message from each of the second and third BSs 404 and 406, the first BS 402 then sends a master BS push message to a BS that sent rejection reason (1), if there is a BS that sent rejection reason (1) from among the rejection reasons included in the NACK messages received by the first BS 402. If there is a plurality of BSs that sent rejection reason (1), then the first BS 402 selects a BS having the best channel state from among the BSs, and sends the master BS push message to the selected BS. If the channel states are the same, a BS having a low cell load is selected, and if the cell loads are also the same, a BS is selected at random.

If there is only a BS that sent rejection reason (2) from among the rejection reasons included in the received NACK messages, then the first BS 402 sends a master BS push message to the BS that sent rejection reason (2). If there is a plurality of BSs that sent rejection reason (2), then the first BS 402 selects a BS having the best channel state from among the BSs, and sends the master BS push message to the selected BS. If the channel states are the same, a BS having a low cell load is selected, and if the cell loads are also the same, a BS is selected at random.

If there is only a BS that sent rejection reason (3) from among the rejection reasons included in the received NACK messages, then the first BS 402 sends a measurement indication message to the first MS 400 to find another nearby BS in step 424, without sending the master BS push message. Specifically, the first BS 402 sends, to the first MS 400, the measurement indication message for commanding to find a new BS by measuring channels of its neighbor BSs, and sends a master BS push message for pushing to become a new master BS, to the second BS 404 in step 426.

Upon receiving the master BS push message, the second BS 404 sends an ACK message for approving the push for the master BS to first BS 402 in step 430, operating as a master BS of the first cloud cell, and sends a master BS change message indicating its change to a master BS of the first cloud cell to the fifth BS 410, which is a master BS of another cloud cell, i.e., the second cloud cell, to which it belongs, in step 428.

Upon receiving the master BS change message, the fifth BS 410 adjusts resource allocation of the second cloud cell, which is changed as the second BS 404 becomes a master BS of the first cloud cell, in step 434, and transmits the adjustment results to the second BS 404 using a resource allocation message in step 436.

The first BS 402 sends a master BS change message to the second and third BSs 404 and 406 and the first MS 400 in steps 438, 440 and 442, the master BS change message, which includes information indicating that the master BS of the first cloud cell is changed to the second BS 404 as the first BS 402 determines the second BS 404 as a new master BS in step 422.

Having received the measurement indication message, the first MS 400 measures channels of the first BS 402 and the second to fourth BSs 404 to 408 in step 432, and transmits the measurement results to the current master BS, i.e., the second BS 404, using a measurement report message in step 444. The measurement report message may be sent periodically, or may be sent sporadically by a command from a master BS.

Thereafter, if the second BS 404 does not provide the minimum service quality to the first MS 400 or if its channel state is less than a threshold for a predetermined time, then the second BS 404 determines to change the master BS of the first cloud cell in step 446, and determines the fourth BS 408 having the most excellent channel state as a master BS based on the channel states of neighbor BSs, which are included in the measurement report message received from the first MS 400.

Thereafter, in step 448, the second BS 404 sends a master BS request message for requesting to become a master BS of the first cloud cell to the fourth BS 408 determined as a candidate for the master BS, in step 448. Upon receiving the master BS request message, the fourth BS 408 determines whether it can provide the minimum service quality to the first MS 400 through the master BS approval control in step 450, and sends an ACK message for accepting the master BS request message to the second BS 404 in step 452 if it can provide the minimum service quality to the first MS 400. Thereafter, in steps 454 to 460, the second BS 404 sends a master BS change message, indicating the change of the master BS of the first cloud cell from the second BS 404 to the fourth BS 408, to each of the first BS 402, the first MS 400, the third BS 406, and the fourth BS 408.

Figure 5:
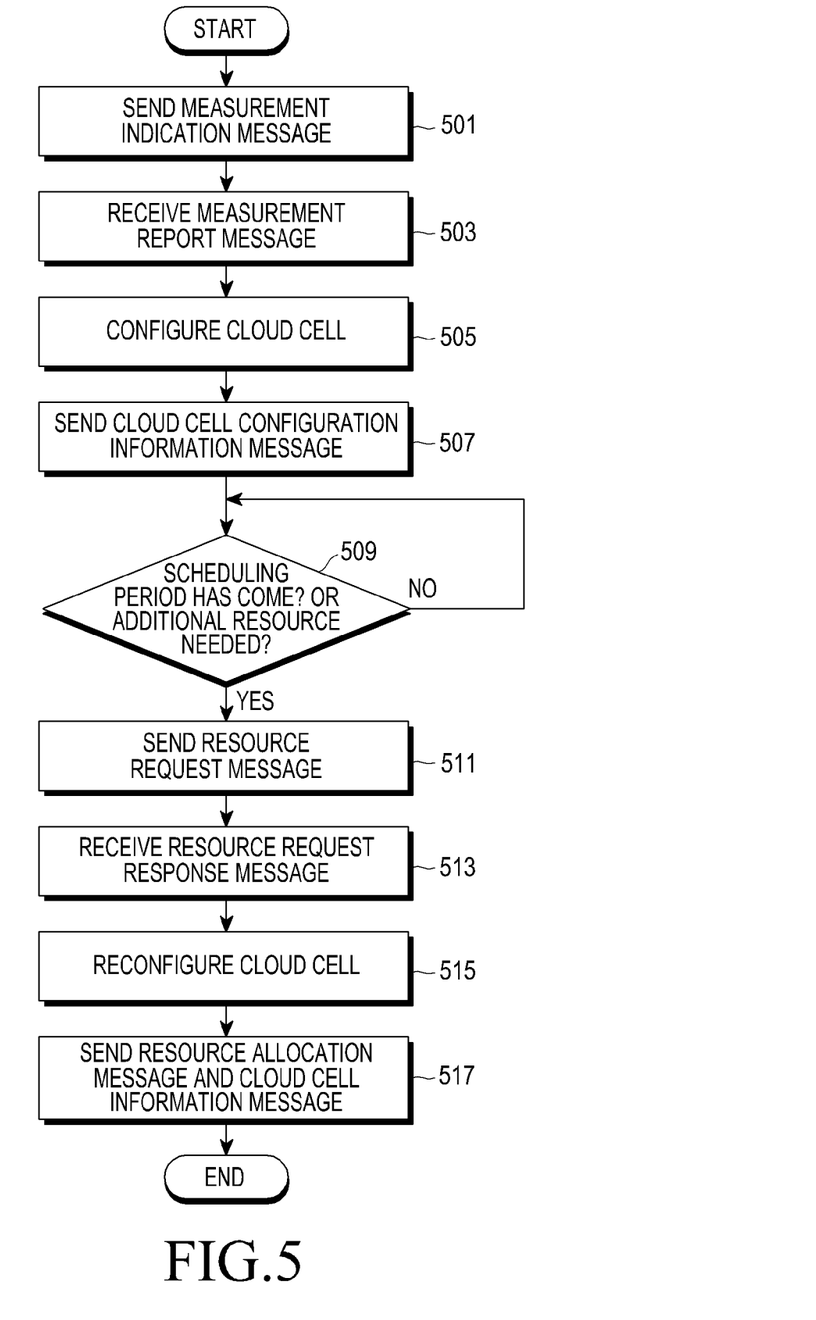
FIG. 5 illustrates a process of configuring and reconfiguring a cloud cell by a BS in a communication system according to an exemplary embodiment of the present invention.

FIG. 5 illustrates a process of configuring and reconfiguring a cloud cell by a BS in a communication system according to an exemplary embodiment of the present invention.

Referring to FIG. 5, in step 501, the BS operating and referred to as a master BS sends, to an MS, a measurement indication message for instructing to measure channel states of its neighbor BSs. In step 503, the master BS receives, from the MS, a measurement report message including channel measurement results for the neighbor BSs.

In step 505, the master BS configures a cloud cell consisting of BSs having an excellent channel state, for example, BSs whose channel state is greater than or equal to a threshold, based on the received measurement report message. In step 507, the master BS sends a message including configuration information of the cloud cell configured in step 505, to all of the cloud cell members, i.e., slave BSs, and the MS.

If it is determined in step 509 that a predetermined scheduling cycle has come or that the master BS needs additional resources in addition to the resources allocated thereto, the master BS sends a resource request message for requesting resource allocation to the slave BSs constituting the cloud cell in step 511. In step 513, the master BS receives, from the slave BSs, a resource request response message including approval control results for determining whether to approve or accept the resource allocation request.

In step 515, the master BS determines at least one slave BS to be included in and at least one slave BS to be excluded from the cloud cell to be reconfigured during reconfiguration of the cloud cell depending on the approval control results, and reconfigures the cloud cell depending on the determination results. For reconfiguration of the cloud cell, the master BS may additionally consider the measurement report message that is periodically received from the MS. Specifically, the master BS determines to include a slave BS that can provide the requested resources to the MS for a threshold time or more, during reconfiguration of the cloud cell, and determines to exclude a slave BS that does not provide the requested resource to the MS for the threshold time or more, during reconfiguration of the cloud cell.

In step 517, the master BS sends a resource allocation message indicating its intention to use resources to the slave BS determined to be included during reconfiguration of the cloud cell, and sends a cloud cell information message including information indicating its exclusion from the cloud cell to the slave BS determined to be excluded during reconfiguration of the cloud cell. In addition, the master BS sends to the MS a cloud cell resource allocation message indicating from which BSs the entire resources of the cloud cell are allocated.

Figure 6:
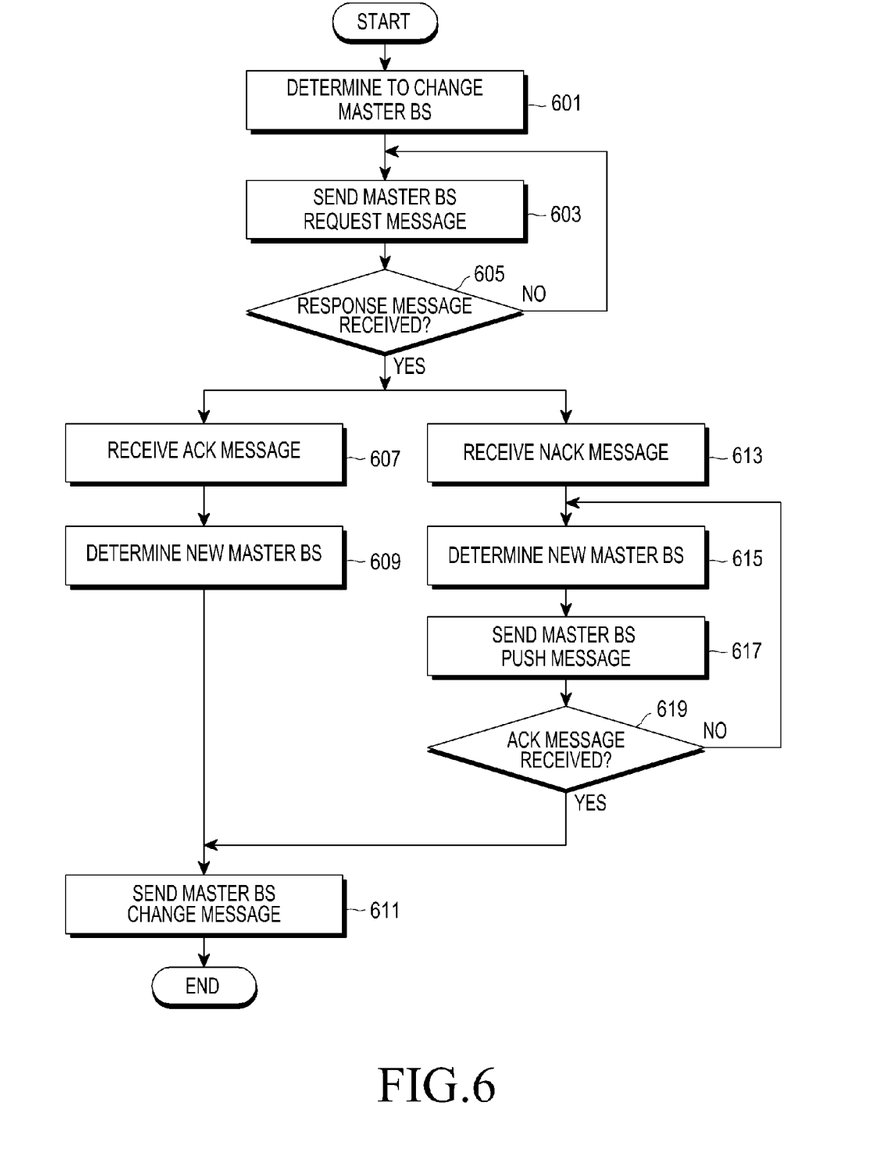
FIG. 6 illustrates a process of changing a master BS in a cloud cell-based communication system according to an exemplary embodiment of the present invention.

FIG. 6 illustrates a process of changing a master BS in a cloud cell-based communication system according to an exemplary embodiment of the present invention.

Referring to FIG. 6, in step 601, the master BS determines to change a master BS of a first cloud cell if it does not provide the minimum service quality or if its channel state is less than a threshold for a predetermined time or more. In step 603, the master BS sends a master BS request message for requesting to become a master BS to each of slave BSs constituting the first cloud cell.

In step 605, the master BS determines whether a response message, such as an ACK/NACK message, indicating the possibility of becoming a master BS is received from the slave BSs. The master BS proceeds to step 607 upon receiving an ACK message from any one of the slave BSs, and proceeds to step 613 upon receiving a NACK message.

First, upon receiving an ACK message from any one of the slave BSs in step 607, the master BS determines a slave BS that sent the ACK message to be a new master BS of the first cloud cell in step 609, and sends a master BS change message, which indicates the change of the master BS to the determined new master BS, to the slave BSs constituting the first cloud cell and the MS, in step 611.

Although it is assumed in the exemplary embodiment of FIG. 6 that the ACK is received from one slave BS by way of example, the present invention is not limited thereto, and the ACK may be received from at least two slave BSs or from any other suitable source. If the ACK is received from the at least two slave BSs, then the master BS determines one slave BS, that is selected based on the other channel state and cell load, to be a new master BS.

Next, upon receiving a NACK message from any one of the slave BSs in step 613, the master BS compares rejection reasons received together with the NACK messages, selects one slave BS having a rejection reason whose priority is lower, and determines the selected slave BS as a new master BS, in step 615.

In step 617, the master BS sends a push message for the determined new master BS to be a master BS to the new master BS determined in step 615. In step 619, the master BS determines whether an ACK message for approving the push for the new master BS is received. Upon receiving the ACK message, the master BS sends a master BS change message indicating the change of the master BS to the determined new master BS, to the slave BSs constituting the first cloud cell and the MS, in step 611. However, upon failure to receive the ACK message in step 619, the master BS returns to step 615.

Although not shown, if the new master BS, as determined in step 615, is included in the first cloud cell and also in another cloud cell, i.e., a second cloud cell, then the BS determined as the new master BS sends a master BS change message, which indicates its change to the master BS of the first cloud cell, to a master BS of the second cloud cell, and receives, from the master BS of the second cloud cell, a resource allocation message including results on the resource allocation which is adjusted as the new master BS is included in the second cloud cell.

Figure 7:
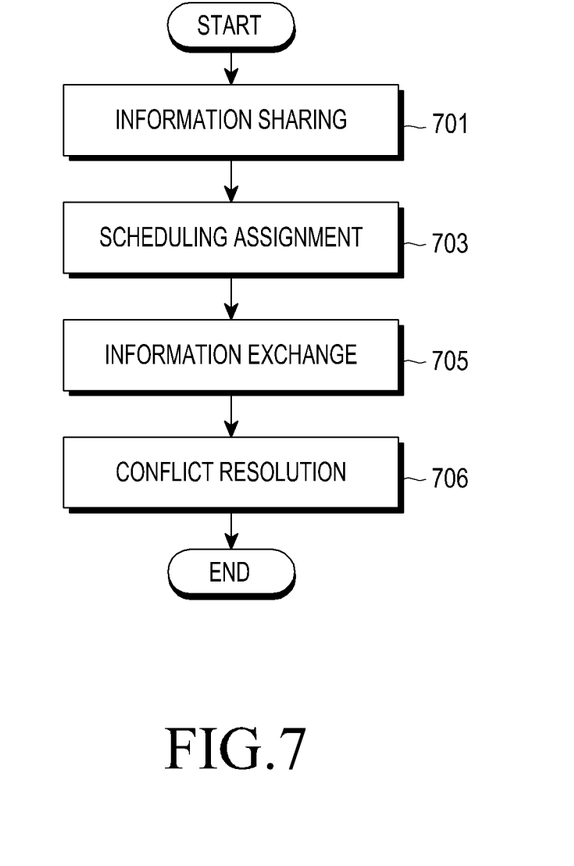
FIG. 7 illustrates a procedure for allocating, by a master BS, resources to MSs that set the master BS itself as a master BS in a distributed control scheme according to an exemplary embodiment of the present invention.

FIG. 7 illustrates a procedure for allocating, by a master BS, resources to MSs that set the master BS itself as a master BS in a distributed control scheme according to an exemplary embodiment of the present invention.

A cloud cell for each MS is configured in accordance with the procedures described with reference to FIGS. 1 and 2 and other procedures of the exemplary embodiments of the present invention. Each MS may receive data from a master BS or slave BSs, and resource allocation for each MS may be determined by the master BS. Multiple BSs constitute a resource allocation-cooperative cell. The resource allocation-cooperative cell is a cell configured with respect to one master BS, unlike the cooperative cell that is configured with respect to an MS. Specifically, the resource allocation-cooperative cell is formed with respect to a specific master BS, and may include another master BS or slave BS of an MS that sets the specific master BS as its master BS or slave BS.

The distributed control scheme-based resource allocation procedure is achieved in the following four steps.

1) Information Sharing Step

In an information sharing step 701, all information needed to allocate resources to each MS in a scheduling assignment step 703 is shared between BSs in the resource allocation-cooperative cell. Particularly, the information shared in the information sharing step 701 includes information, such as Channel State Information (CSI), interfering link information, and any other similar and/or suitable information, used to calculate a specific metric that is used to allocate resources to MSs in the scheduling assignment step 703. The CSI may include information for indicating the channel state and quality between each MS and each BS belonging to the MS's cloud cell. The interfering link information may include index information of a BS in which the amount of interference that each MS suffers is greater than or equal to a threshold.

2) Scheduling Assignment Step

In the scheduling assignment step 703, each master BS allocates the resources to MSs of all BSs in the resource allocation-cooperative cell using the information shared in the information sharing step 701, and determines the resources it will allocate to the MSs belonging to the master MS. Each master BS allocates resources to MSs so as to maximize a specific metric, such as a sum of average data rates of BSs and a sum of transmit powers of BSs, in which fairness between MSs is considered, which is calculated considering all BSs in the resource allocation-cooperative cell. The master BS selects one or some MSs from among MSs of all BSs in the resource allocation-cooperative cell, as a target for resource allocation depending on the amount of its available resources. The MSs may be selected in accordance with Equation (1) below.

$$U^* = \underset{U}{\operatorname{argmax}} \prod_{U \subset \{k | k \in M_j \text{ for } j \in S_i\}} \left(1 + \frac{R_k}{(T-1)R_k'}\right) \quad \text{Equation (1)}$$

Equation (1) is used for selecting MSs for resource allocation in an i-th BS, which may be a master BS. Equation (1) is used to find a set U* of MSs, from among all the MSs that set BSs in the resource allocation-cooperative cell as its master BS or slave BSs, wherein the set U* is of MSs that maximize a specific metric. A value obtained by multiplying all $(1+R_k/((T-1)*R_k'))$ with respect to MSs belonging to the set is used as an example of the specific metric.

In Equation (1), $R_k$ denotes a data rate, i.e., a throughput, at which data can be transmitted to a k-th MS when resources are allocated presently, and $R_k'$ denotes an average data rate, i.e., an average data rate of a k-th MS until the previous time slot, for a k-th MS until resources are allocated. T denotes a window size used to calculate an average data rate, i.e., denotes a time or interval in which an average is taken to calculate an average data rate. $S_i$ denotes a set of BSs, including an i-th BS as well, in the resource allocation-cooperative cell configured centering on the i-th BS, and $M_j$ denotes a set of MSs that have a j-th BS as their master BS.

3) Information Exchange Step

In an information exchange step 705, the scheduling assignment results and additional information needed in the next step, i.e., a conflict resolution step 706, are exchanged between BSs in the resource allocation-cooperative cell. The scheduling assignment results exchanged between BSs are resource allocation information for the MSs belonging to a master BS in the set U* that the master BS selected using Equation (1). However, resource allocation information for all the MSs belonging to the set U* may be exchanged to assist in the conflict resolution step 706 or the re-scheduling assignment step. The addition information includes priority information for allocation of each resource. The priority information represents importance of each allocation with respect to the system performance. As an example, a value of $(1+R_k/((T-1)*R_k'))$ in Equation (1) may be used as priority information of resource allocation for a k-th MS. As another example, a reciprocal of the minimum delay time value of the service that the MS receives may be used as priority information.

4) Conflict Resolution Step

Conflicts may occur between resources allocated by different BSs. Specifically, if the same resources are allocated to different MSs, it may be a case where conflicts have occurred between two resource allocations.

In the conflict resolution step 706, conflicts are resolved in accordance with predefined rules in a BS having the same resources, between which conflicts have occurred. For example, priority information, which may be acquired in the information exchange step 705, for two resource allocations, between which conflicts have occurred, may be compared to invalidate the low-priority resource allocation. New resource allocation information obtained after the resolution of conflicts is delivered to master BSs of MSs related to the conflicts.

After the conflict resolution step 706, each BS transmits data to the MS according to the conflict resolving new resource allocation information. If the BS is a master BS, then it may re-allocate the secured resources to other MSs. The scheduling assignment step 703, the information exchange step 705 and the conflict resolution step 706 may be repeatedly performed, and after the repetition is completed, each BS may transmit data to the MS according to the information about resources allocated in the scheduling assignment step 703 or according to new resource allocation information in the conflict resolution step 706.

Figure 8:
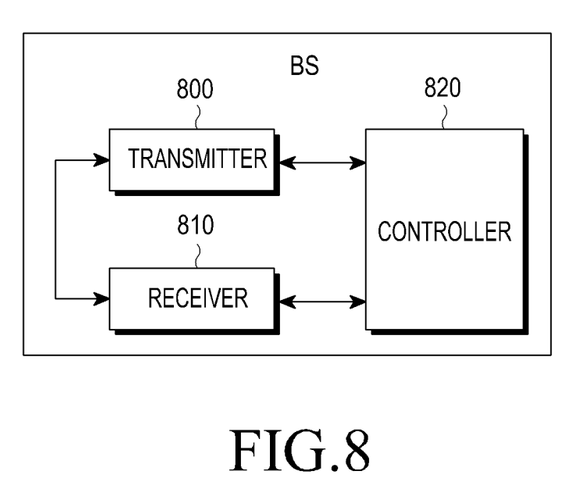
FIG. 8 illustrates a BS apparatus for performing an operation of configuring and/or reconfiguring a cloud cell and an operation of changing a master BS in a cloud cell in a communication system in which multiple BSs provide a service to one MS according to an exemplary embodiment of the present invention.

FIG. 8 illustrates a BS apparatus for performing an operation of configuring and/or reconfiguring a cloud cell and an operation of changing a master BS in a cloud cell in a communication system in which multiple BSs provide a service to one MS according to an exemplary embodiment of the present invention.

According to the present exemplary embodiment, the BS apparatus in FIG. 8 may perform an operation of allocating, by a master BS, resources to MSs that set the master BS as their master BS as shown in the exemplary embodiment of FIG. 7. However, the present invention is not limited thereto, and the BS apparatus of FIG. 8 may perform other suitable operations of a BS apparatus.

Referring to FIG. 8, the BS includes a transmitter 800, a receiver 810 and a controller 820.

First, a description will be made of the operation of configuring and reconfiguring a cloud cell by a BS. If the transmitter 800 sends a measurement indication message for instructing to measure channels of its neighbor BSs to an MS and the receiver 810 receives, from the MS, a measurement report message including the channel measurement results, the controller 820 may configure a first cloud cell consisting of BSs whose channel state is greater than or equal to a threshold, based on the received measurement report message, and may control the transmitter 800 to transmit member information of the first cloud cell to each of the slave BSs constituting the first cloud cell and the MS.

If the master BS needs additional resources in addition to the resources allocated thereto, the controller 820 may control the transmitter 800 to send a resource request message for requesting resource allocation to slave BSs constituting the first cloud cell, and may control the receiver 810 to receive a resource request response message including approval control results for determining whether to approve the resource allocation request, from each of the slave BSs. Thereafter, the controller 820 may reconfigure the first cloud cell according to the approval control results.

Next, a description will be made of the operation of changing a master BS in a cloud cell by a BS. The controller 820 may configure a first cloud cell, including one master BS and at least one slave BS as described above, and if the controller 820 determines to change the master BS of the first cloud cell, the controller 820 may control the transmitter 800 to send a master BS request message for requesting to become a master BS to each of the at least one slave BS, and may control the receiver 810 to receive an ACK message indicating the possibility of becoming a master BS from any one of the at least one slave BS.

Thereafter, the controller 820 may determine a slave BS that sent the ACK to be a new master BS of the first cloud cell, and may control the transmitter 800 to send a master BS change message indicating the determined new master BS to the MS and each of the at least one slave BS. Upon receiving a NACK and a corresponding rejection reason from each of at least two slave BSs through the receiver 810, the controller 820 may compare the received rejection reasons, determine a slave BS having a lower-priority rejection reason as a new master BS, and control the transmitter 800 to send a push message for the determined new master BS to become a master BS to the determined new master BS.

Figure 9:
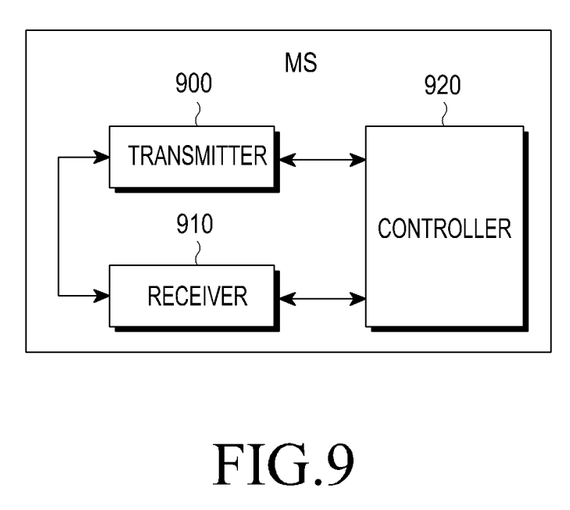
FIG. 9 illustrates a Mobile Station (MS) apparatus for performing an operation of receiving a service provided from multiple BSs by an MS according to an exemplary embodiment of the present invention.

FIG. 9 illustrates an MS apparatus for performing an operation of receiving a service provided from multiple BSs by an MS according to an exemplary embodiment of the present invention.

According to the present exemplary embodiment, the MS apparatus in FIG. 9 may be an MS to which a master BS has allocated resources in allocating resources to MSs that set the master BS as their master BS as shown in the exemplary embodiment of FIG. 7. However, the present invention is not limited thereto, and the MS apparatus of the present exemplary embodiment may be an MS having resources allocated according to any suitable manner.

Referring to FIG. 9, the MS includes a transmitter 900, a receiver 910 and a controller 920. If the receiver 910 receives a measurement indication message for instructing the MS to measure channels of its neighbor BSs from a master BS included in a first cloud cell, then the controller 920 controls the transmitter 900 to send a measurement report message including channel measurement results for the neighbor BSs. After the receiver 910 receives information about the members included in the first cloud cell consisting of the master BS and at least one slave BS from the master BS, then the controller 920 receives a service that the master BS and the at least one slave BS provide in cooperation.

Upon detecting the change of the master BS from a BS of the first cloud cell to a new master BS, the controller 920 controls the receiver 910 to receive a master BS change message, which indicates the BS determined as the new master BS, from the master BS. As is apparent from the foregoing description, the exemplary embodiments of the present invention provide a method of providing a communication service to one MS by multiple BSs in cooperation in a wireless communication system, making it possible to more efficiently use the limited resources and thus contributing to the improvement of the service quality level provided to MSs.

In addition, according to the exemplary embodiments of the present invention, a BS that simultaneously belongs to several different cooperative cells in the centralized control scheme or the distributed control scheme may prevent conflicts which may occur as resource allocation commands received from master BSs of different cooperative cells allocate the same resources in a duplicate manner.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving a service from a plurality of base stations (BSs) by a mobile station (MS) in a wireless communication system, the method comprising:
    receiving a measurement indication message instructing to measure channels of neighbor BSs from a master BS of a cooperative cell including the master BS allocating resources of the cooperative cell and at least one slave BS providing a service to the MS in cooperation with the master BS;
    transmitting a measurement report message including measurement results of the channels of the neighbor BSs;
    receiving configuration information related to the cooperative cell from the master BS; and
    receiving a service provided based on the master BS and the at least one slave BS in cooperation.

2. The method of claim 1, further comprising:
    receiving a master BS change message indicating that the master BS is changed to a new master BS from the master BS, if the master BS of the first cooperative is changed to the new master BS.

3. The method of claim 1, further comprising:
    receiving resource allocation information related to a conflict-resolved resource which resolves a conflict between resource allocations occurring in a resource allocation procedure of resource allocation-cooperative cells,
    wherein the service is received based on the resource allocation information.

4. The method of claim 3, wherein the MS is selected based on the following equation, as one among MSs of all BSs of each of the resource allocation-cooperative cells, $$U^* = \underset{U}{\arg\max} \prod_{U \subset \{k | k \in M_j \text{ for } j \in S_i\}} \left(1 + \frac{R_k}{(T-1)R'_k}\right)$$

where Rk denotes a data rate at which data is transmitted to a k-th MS when resources are allocated presently, Rk' denotes an average data rate for a k-th MS until resources are allocated, T denotes a window size used to calculate the average data rate, $S_i$ denotes a set of BSs in a resource allocation-cooperative cell configured with respect to an i-th BS, and $M_j$, denotes a set of MSs having a j-th BS as the master BS.

5. A mobile station (MS) for receiving a service from a plurality of base stations (BSs) in a wireless communication system, the MS comprising:
    a receiver configured:
        to receive a measurement indication message instructing to measure channels of neighbor BSs from a master BS of a cooperative cell including the master BS allocating resources of the cooperative cell and at least one slave BS providing a service to the MS in cooperation with the master BS,
        to receive configuration information related to the cooperative cell from the master BS, and
        to receive a service provided based on the master BS and the at least one slave BS in cooperation, and
    a transmitter configured to transmit a measurement report message including measurement results of the channels of the neighbor BSs.

6. The MS of claim 5, wherein the receiver is further configured to receive a master BS change message indicating that the master BS is changed to a new master BS from the master BS, if the master BS of the cooperative cell is changed to the new master BS.

7. The MS of claim 5,
wherein the receiver is further configured to receive resource allocation information related to a conflict-resolved resource which resolves a conflict between resource allocations occurring in a resource allocation procedure of resource allocation-cooperative cells, and
wherein the service is received based on the resource allocation information.

8. The MS of claim 7, wherein the MS is selected based on the following equation, as one among MSs of all BSs of each of the resource allocation-cooperative cells, $$U^* = \underset{U}{\operatorname{argmax}} \prod_{U \subset \{k | k \in M_j \text{ for } j \in S_i\}} \left(1 + \frac{R_k}{(T-1)R'_k}\right)$$

where $R_k$ denotes a data rate at which data is transmitted to a k-th MS when resources are allocated presently, $R_k'$ denotes an average data rate for a k-th MS until resources are allocated, T denotes a window size used to calculate the average data rate, Si denotes a set of BSs in a resource allocation-cooperative cell configured with respect to an i-th BS, and $M_j$, denotes a set of MSs having a j-th BS as the master BS.

* * * * *